United States Patent [19]

Hsu

[11] Patent Number: 5,697,331

[45] Date of Patent: Dec. 16, 1997

[54] ENVIRONMENT-PROTECTION AND COMBUSTION-SUPPORTING DEVICE USED ON THE INTAKE OF AN ENGINE

[76] Inventor: Pao Yuan Hsu, No. 54, Shoei-Liou, Lin 20, Shyr-Leei Village, Shin-U Hsiang, Tao-Yuan Hsien, Taiwan

[21] Appl. No.: 748,166

[22] Filed: Nov. 12, 1996

[51] Int. Cl.$^6$ ..................................................... F02B 47/02
[52] U.S. Cl. ................................................ 123/25 A; 123/539
[58] Field of Search ............................. 123/25 R, 25 A, 123/539

[56] References Cited

U.S. PATENT DOCUMENTS

| 2,715,392 | 8/1955 | Grevas | 123/25 A |
|---|---|---|---|
| 2,717,148 | 9/1955 | Hall | 123/25 A |
| 4,080,936 | 3/1978 | Penland | 123/25 A |
| 4,725,226 | 2/1988 | Balsiger et al. | 123/25 A |
| 5,010,869 | 4/1991 | Lee | 123/539 |
| 5,061,462 | 10/1991 | Suzuki | 123/539 |
| 5,199,386 | 4/1993 | Hubbard | 123/25 A |

FOREIGN PATENT DOCUMENTS

| 1098947 | 3/1955 | France | 123/25 A |
|---|---|---|---|

*Primary Examiner*—Erick R. Solis
*Attorney, Agent, or Firm*—Pro-Techtor International

[57] ABSTRACT

An "environment-protecting and combustion-supporting device", is mounted on the front end of the intake manifold of a car engine for providing air with a high content of oxygen, hydrogen molecules and high humidity. The device improves combustion efficiency of the engine and lowers intake temperature to reduce damage to the engine. Toxic substances such as carbon monoxide (CO) and hydrogenated carbon (HC) are reduced to improve air quality.

6 Claims, 4 Drawing Sheets

ENVIRONMENT-PROTECTION AND COMBUSTION-SUPPORTING DEVICE USED ON THE INTAKE OF AN ENGINE

BACKGROUND OF THE INVENTION

1. Field of the Invention

The present invention relates to an "environment-protecting and combustion-supporting device" which is mounted on the front end of the intake manifold of an engine. The device provides air with a high content of oxygen and hydrogen molecules as well as with high humidity and low temperature for use in mixing gas for combustion in the engine. The device provides air with a high content of oxygen and hydrogen molecules as well as with high humidity and low temperature for use in mixing gas for combustion in the engine.

The device achieves the multiple purposes of improving combustion efficiency of the engine, saving oil, and prolonging the life of the engine, reducing discharge of toxic substances, increasing horse power and torque, and reducing accumulation of carbon deposits, etc.

2. Description of the Prior Art

In the operation of a conventional car engine, fuel is supplied to a combustion chamber of the engine where it is mixed with air provided by the air manifold. The fuel/air mixture is exploded to drive the pistons in the engine to generate power.

Car engines in modern times are mostly controlled by computers in the cars. To improve engine performance, the fuel/air intake process can be improved. As is well known, the ideal combustion ratio for an engine is 14.7:1; however, almost all cars produced can only achieve a ratio of between about 11:1–12.2:1. Due to incomplete combustion of fuel in the engines in these cars, the engines are worn more quickly, thereby shortening the engine's life. Excessive exhausting and knocking in the cylinders also often occurs. The discharge of toxic substances such as carbon monoxide(CO) and hydrogenated carbon (HC) in the exhaust pollutes the air, and reduces the air quality.

Although there are many devices for intakes that increase the amount of air supplied, they are directed only to increasing the amount of air supplied. Little importance is placed on altering the humidity, oxygen content, etc. of the air. Hence, combustion efficiency is not effectively increased.

SUMMARY OF THE INVENTION

In view of this, the inventor of the present invention provides the present device for improving quality of intake air and increasing combustion efficiency.

The principal object of the present invention is to provide the multiple advantages of saving oil, protecting the environment, and prolonging the life of engines by improving the humidity and the oxygen and hydrogen content in air in the intake of an engine to increase combustion efficiency.

The objects of the present invention are achieved by: mounting a device with water therein on the front end of the intake manifold of the engine to allow air passing through the device to absorb a large amount of water molecules before it passes into the intake manifold of the engine. The device is provided with a plurality of members for improving the condition of the air.

The present invention will be apparent in its practical structure and functions after reading the detailed description of the preferred embodiment thereof in reference to the accompanying drawings.

DETAILED DESCRIPTION OF THE PREFERRED EMBODIMENT

Figure 1:
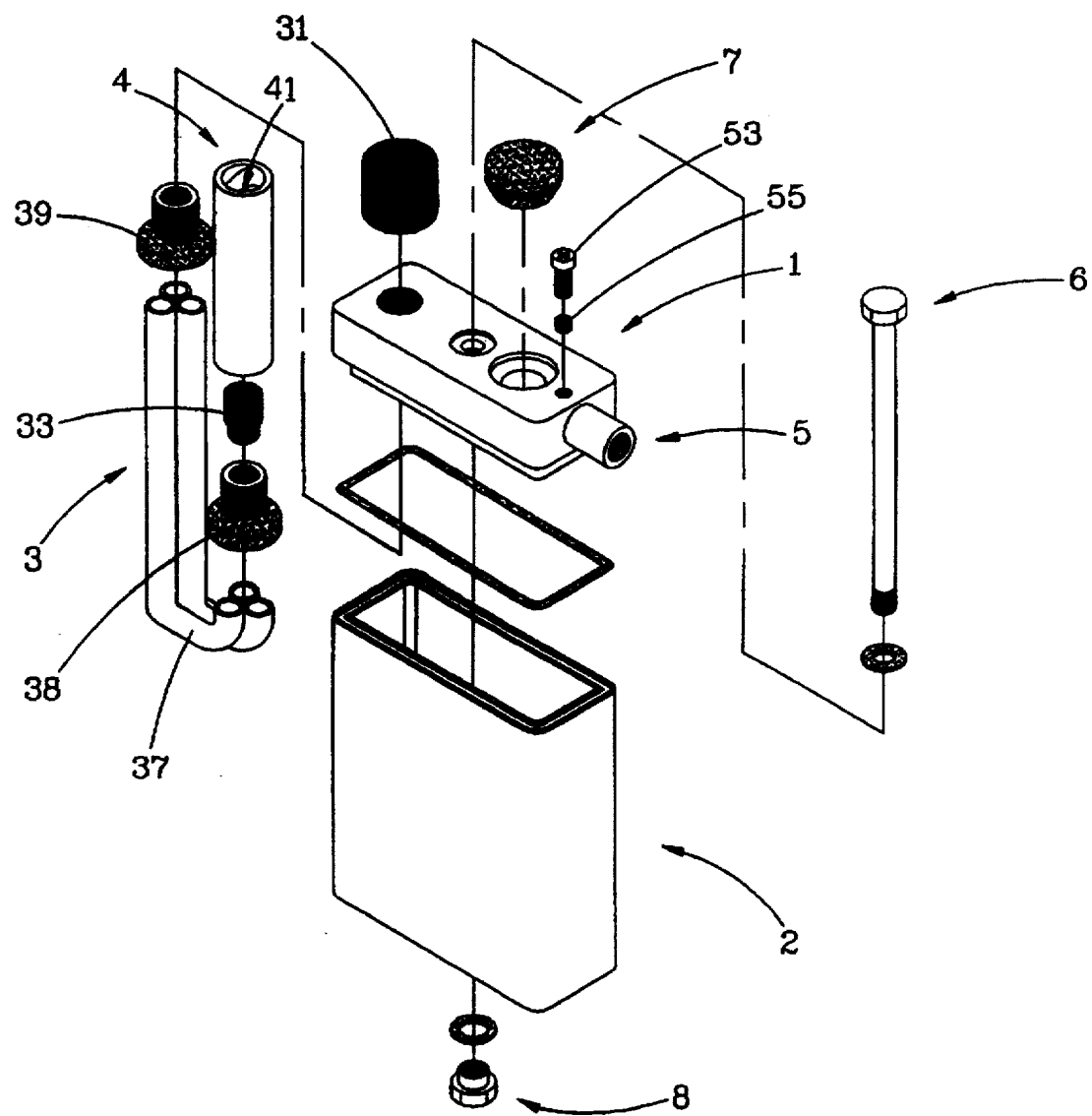
FIG. 1 is an exploded view of the present invention.
Figure 2:
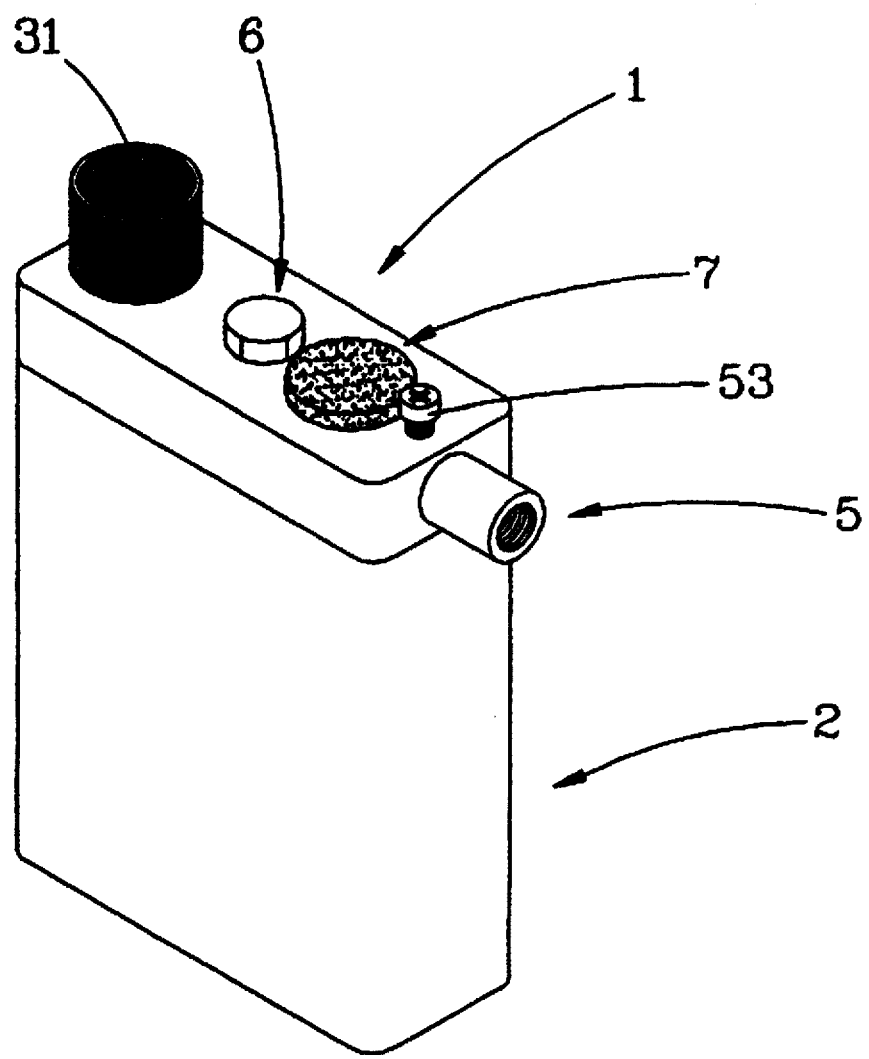
FIG. 2 is a perspective view of the present invention after it has been assembled.

Referring first to FIGS. 1 and 2, the environment-protecting and combustion-supporting device of the present invention is comprised mainly of an upper hood 1, a housing 2, an air conducting pipe 3, a magnetic filed current guide 4, a discharging pipe 5, a connecting bolt 6, a water injection port 7, and a water discharging port cover 8.

The upper hood 1 is placed on the top of the housing 2 which is hollowed and is opened only on a top side thereof. The other sides, the bottom and the side walls, are closed so that the device holds water. The upper hood 1 is provided with the openable water injection port cover 7 that is opened to inject water into the housing 2. The upper hood 1 is further provided with a hole that receives the top of the air conducting pipe 3 by means of a connector 39 which protrudes upwardly from the upper hood 1. An intake filter 31 is provided on the top of the hole. The intake filter 31 is an air filtering mesh member which can prevent larger impurities in the air from entering the air conducting pipe.

The air conducting pipe 3 extends downward from the intake filter 31 into the housing 2 toward the bottom plate 21 of the housing 2. The pipe 3 has a transverse section 37 and thereafter extends upward so as to from a "J"-shaped member. There can be any number of the air conducting pipes as desired by the user.

A secondary filter 33 is connected by a lower connector 38 to the distal end of the air conditioning pipe 30. The secondary filter 33 is also an air filtering mesh member and is capable of stopping impurities in the air from leaving the air conducting pipe 3.

The magnetic field current guide 4 is cylindrical, and is positioned above the secondary filter 33. The inner wall 41 of the magnetic field current guide 4 is irregularly corrugated or is threaded. The transverse bottom section 37 of the air conducting pipe 3 contact the bottom plate 21 of the housing 2. A positioning groove (not shown) can be proved on the bottom plate of the housing 2 to hold the air conducting pipe 3 in its position so that the air conducting pipe 3 is not displaced.

The upper hood 1 and the housing 2 are locked together by the connecting bolt 8. The water discharging port cover 8 is provided at the bottom of the bottom of the housing 2 to allow discharging or changing of the water contained in the housing. The discharging pipe 5 is provided on one side of the upper hood I to connect the device to the intake manifold of the engine. The discharging pipe 5 is provided with an adjusting screw 53 that controls an amount of the discharged air.

Conventionally, when an engine is operated it simply sucks in air. An engine operating with the present invention takes advantage of the intake action of the engine to force air into the device of the present invention.

Figure 3:
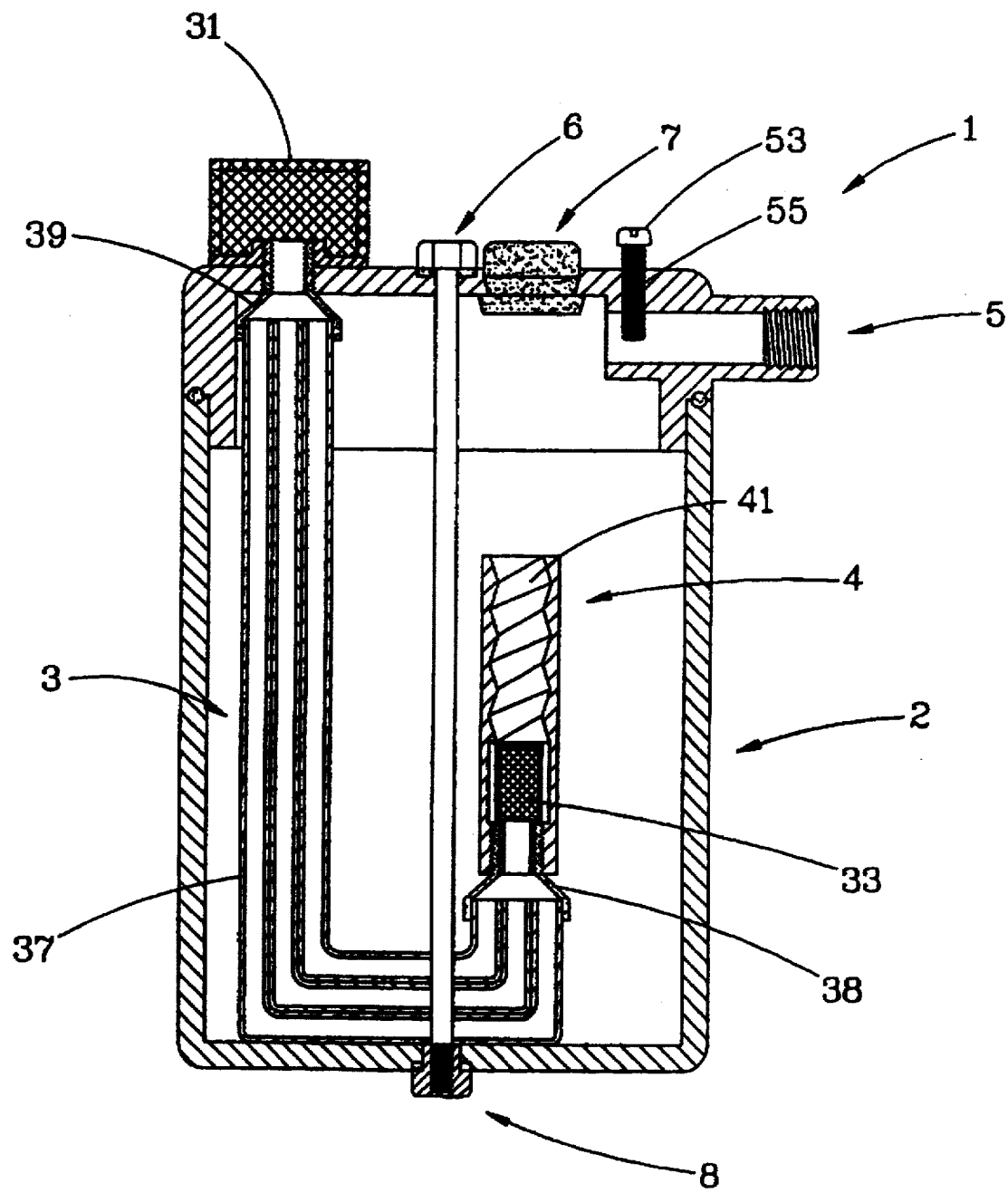
FIG. 3 is a schematic sectional view of the present invention.
Figure 4:
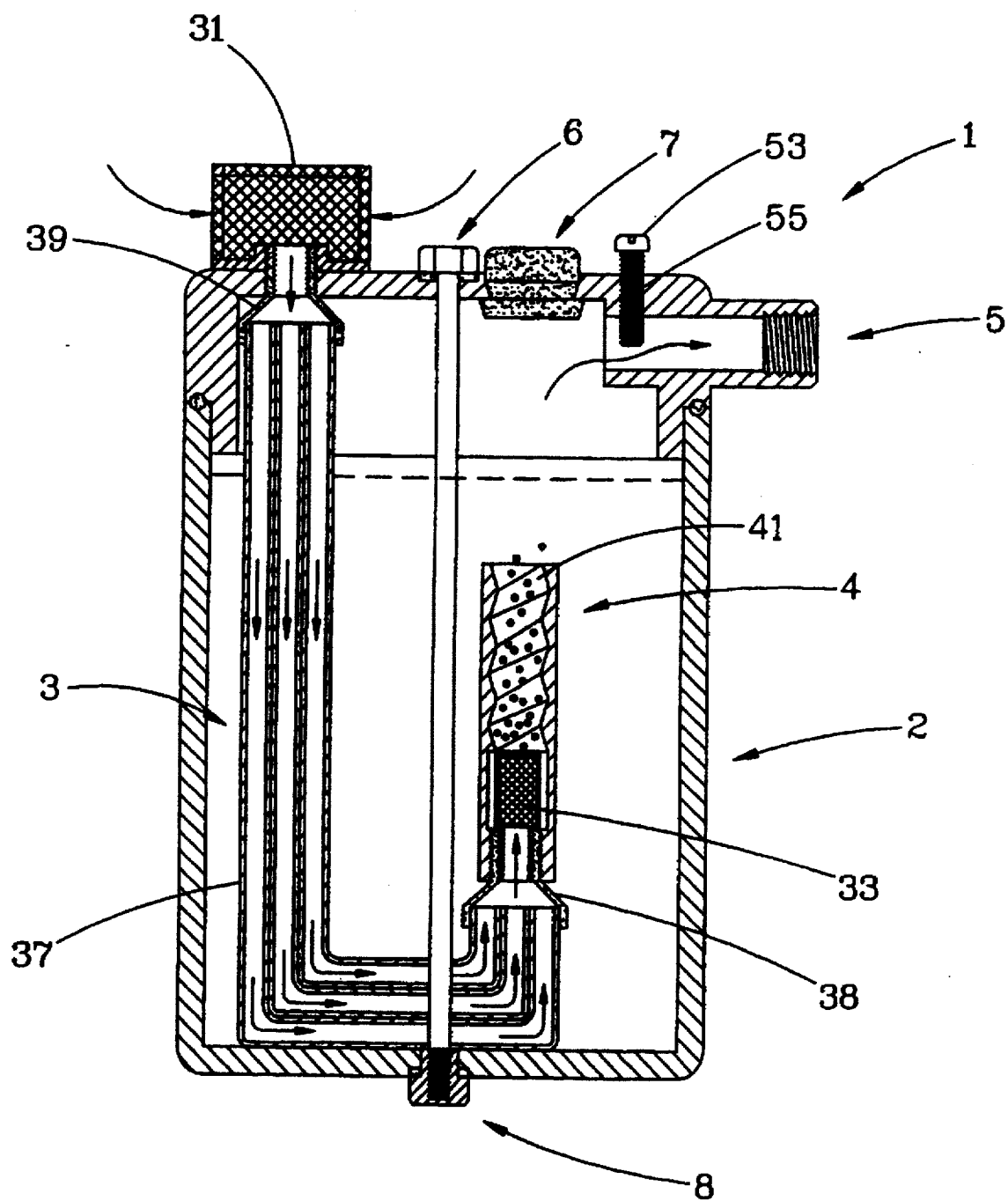
FIG. 4 is a sectional view showing the function of the present invention.

Referring now to FIGS. 3 and 4, the process and function of the present invention is as follows: when intake pressure is applied to the discharging pipe 5, air is forced into the intake filter 31, through the air conducting pipe 3 and the secondary filter 33 toward the magnetic filed current guide 4. The magnetism of the magnetic field current guide 4 and the irregularity corrugated or threaded surface of the inner wall 41 change the molecular structure of the air, generating vaporized water according to the principal of the effect of the magnetic filed and air compression. In other words, the air here carries a large amount of humidity, comprising oxygen and hydrogen molecules so that the temperature is significantly lowered. The discharging pipe 5 continually creates a suction force to gradually draw air to the water surface. Finally, air is absorbed into the discharging pipe 5 and discharged to the engine. The inventor found by practical measurement that the combustion ratio of the engine can be close to the ideal state, i.e., the ratio of 14.7:1 by using air with a large amount of humidity, oxygen and hydrogen molecules. Complete combustion can be effected in the engine without loss of horse power, rather, horse power and torque can be adequately developed. This can help save oil and avoid the accumulation of carbon, thereby avoiding damage and knocking in the engine. More importantly, the discharging of toxic substances such as carbon monoxide (CO) and hydrogenated carbon (HC), etc, are effectively reduced.

Having thus described the technical structure of the "environment-protecting and combustion-supporting device" of the present invention, the inventor has found through experiments that complete combustion can be effected by the present invention, whereby, oil can be saved and horse power and torque can be adequately developed. This helps avoid the accumulation of carbon, and even reduces the discharge of toxic substances such as carbon monoxide (CO) and hydrogenated carbon (HC).

I claim:

1. A combustion improving device comprising:

an upper hood, a housing that contains water, an air conducting pipe, a magnetic field current guide, a discharging pipe, a connecting bolt, an expandable water injection port cover on said upper hood, a water discharging port cover; wherein, said upper hood covers a top of said housing, said upper hood includes a hole that is connected to said air conducting pipe by a connector that protrudes from said upper hood, an intake filter covers said hole, said air conducting pipe extends downward from said intake filter into said housing toward the bottom plate of said housing, said air conducting pipe then bends upward, a secondary filter is connected by a lower connector to a distal end of said air conducting pipe, said magnetic field current guide is connected to said secondary filter, such that said magnetic field current guide is submerged in said water in said housing, said upper hood and said housing are connected by said connecting bolt, said discharging pipe is provided on one side of said upper hood to connect the device to an intake manifold of an engine; such that when in operation, said engine sucks air from said housing creating suction through said discharging pipe, thereby drawing air into said intake filter, said air passes through said air conducting pipe and said secondary filter and then to said magnetic field current guide, as said air passes through said magnetic field current guide, vaporized water is added to said air, and said air then enters said intake manifold of said engine.

2. The combustion improving device as defined in claim 1, wherein:

said device includes at least a second air conducting pipe.

3. The combustion improving device as defined in claim 1, wherein:

a groove is provided on a bottom plate of said housing to locate said air conducting pipe to prevent it from being displacing.

4. The combustion improving device as defined in claim 1, wherein:

an inner wall of said magnetic field current guide comprises an irregular surface.

5. The combustion improving device as defined in claim 1, wherein:

said intake filter and said secondary filter comprise mesh members.

6. The combustion improving device as defined in claim 1, wherein:

said discharging pipe includes an adjusting screw to control an amount of discharged air.

* * * * *